(12) United States Patent
Froitzheim

(10) Patent No.: US 9,831,708 B2
(45) Date of Patent: Nov. 28, 2017

(54) CHARGING DEVICE FOR A PORTABLE DEVICE IN A MOTOR VEHICLE

(71) Applicant: Continental Automotive GmbH, Hannover (DE)

(72) Inventor: Herbert Froitzheim, Pettendorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 83 days.

(21) Appl. No.: 14/398,986

(22) PCT Filed: May 2, 2013

(86) PCT No.: PCT/EP2013/059084
§ 371 (c)(1),
(2) Date: Nov. 5, 2014

(87) PCT Pub. No.: WO2013/167439
PCT Pub. Date: Nov. 14, 2013

(65) Prior Publication Data
US 2015/0091513 A1  Apr. 2, 2015

(30) Foreign Application Priority Data
May 8, 2012 (DE) .......................... 10 2012 207 586

(51) Int. Cl.
*H02J 7/02* (2016.01)
*H02J 5/00* (2016.01)

(52) U.S. Cl.
CPC .............. *H02J 7/025* (2013.01); *H02J 5/005* (2013.01)

(58) Field of Classification Search
CPC ....... H02J 7/025; H02J 5/005; B60L 11/1816; B60L 11/11182; B60L 11/1829

USPC ................................... 320/108, 114, 137–139
See application file for complete search history.

(56) References Cited

U.S. PATENT DOCUMENTS

| 4,774,624 | A | * | 9/1988 | Qualich | F02D 41/20 |
| | | | | | 123/490 |
| 6,118,249 | A | * | 9/2000 | Brockmann | H02J 7/025 |
| | | | | | 320/106 |
| 6,972,543 | B1 | | 12/2005 | Wells | 320/108 |
| 7,208,912 | B2 | | 4/2007 | Ghabra et al. | 320/108 |
| 8,129,942 | B2 | | 3/2012 | Park et al. | 320/108 |
| 2005/0030774 | A1 | * | 2/2005 | Vazquez Carazo | H02M 7/003 |
| | | | | | 363/84 |

(Continued)

FOREIGN PATENT DOCUMENTS

| CN | 101233666 A | 7/2008 | ............... H02J 7/00 |
| DE | 102007049564 A1 | 7/2009 | ............. B60R 25/24 |
| WO | 2013/167439 A1 | 11/2013 | ............... H02J 5/00 |

OTHER PUBLICATIONS

International Search Report and Written Opinion, Application No. PCT/EP2013/059084, 11 pages, dated Aug. 2, 2013.

(Continued)

*Primary Examiner* — Paul Dinh
(74) *Attorney, Agent, or Firm* — Slayden Grubert Beard PLLC

(57) ABSTRACT

A charging device for a portable device, e.g., in a motor vehicle, includes a resonant circuit, controllable by a trigger device, for inductive transmission of energy to the portable device, wherein the trigger device is designed such that the curve shape of the excitation for the resonant circuit is generated based on an operating state of the charging device.

18 Claims, 1 Drawing Sheet

(56) References Cited

U.S. PATENT DOCUMENTS

| | | | |
|---|---|---|---|
| 2005/0100175 A1* | 5/2005 | Du | H04M 1/6075 381/86 |
| 2006/0028176 A1 | 2/2006 | Tang et al. | 320/114 |
| 2008/0238364 A1* | 10/2008 | Weber | H02J 7/025 320/108 |
| 2009/0066157 A1* | 3/2009 | Tarng | H03B 5/04 307/31 |
| 2009/0174364 A1 | 7/2009 | Onishi et al. | 320/108 |
| 2010/0176659 A1 | 7/2010 | Aoyama et al. | 307/104 |
| 2012/0223583 A1* | 9/2012 | Cooley | H02J 3/385 307/82 |
| 2013/0207603 A1* | 8/2013 | Kappeler | H01P 7/00 320/108 |

OTHER PUBLICATIONS

Chinese Office Action, Application No. 201380024037.1, 13 pages, dated Jan. 25, 2016.

* cited by examiner

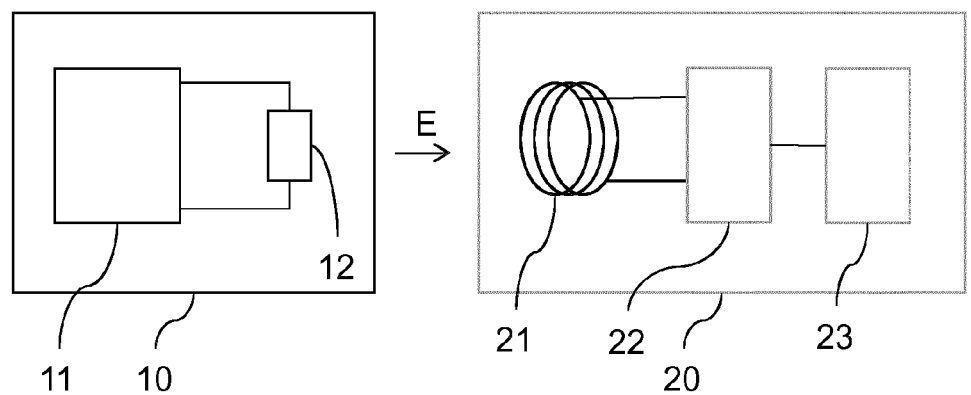

CHARGING DEVICE FOR A PORTABLE DEVICE IN A MOTOR VEHICLE

CROSS-REFERENCE TO RELATED APPLICATIONS

This application is a U.S. National Stage Application of International Application No. PCT/EP2013/059084 filed May 2, 2013, which designates the United States of America, and claims priority to DE Application No. 10 2012 207 586.0 filed May 8, 2012, the contents of which are hereby incorporated by reference in their entirety.

TECHNICAL FIELD

The invention relates to a charging device and to a method for operating a charging device for a portable device. The charging device comprises a resonant circuit, which can be controlled by means of an actuation apparatus, for inductively transmitting energy to the portable device. For example, the charging device may be provided in a motor vehicle for charging the portable device.

BACKGROUND

Charging devices for inductively transmitting energy are known, for example, from electrical toothbrushes. In future, portable devices such as, for example, mobile phones, MP3 players and the like will also be charged by means of inductive alternating field. Such portable devices have electronics which are capable of deciding whether or not the energy store is to be charged. So that a charging device can recognize whether the portable device which is arranged in the spatial vicinity of the charging device has to be charged at all, the inductive alternating field is switched on for a short time until the portable device, which is introduced into the area of action of the charging device, confirms, through communication with the charging device, the presence and the intention to be charged. This process is referred to as "polling".

SUMMARY

One embodiment provides a charging device for a portable device, in particular of a motor vehicle, comprising a resonant circuit, which can be controlled by means of an actuation apparatus, for inductively transmitting energy to the portable device, wherein the actuation apparatus is configured in such a way that the curve shape of the excitation of the resonant circuit is generated as a function of an operating state of the charging device.

In a further embodiment, the curve shapes of the excitation of the resonant circuit are different in a first and a second operating state in respect of the power loss occurring in the actuation apparatus.

In a further embodiment, the first operating state a square-wave oscillation is provided as the curve shape for the excitation of the resonant circuit.

In a further embodiment, the first operating state comprises charging an energy store of the portable device, during which the energy content of the energy store is increased, and/or comprises charging the energy store of the portable device while the ignition of the vehicle is switched off.

In a further embodiment, in the second operating state an oscillation which deviates from the square-wave oscillation, in particular a sinusoidal oscillation or a trapezoidal oscillation, is provided as the curve shape for the excitation of the resonant circuit.

In a further embodiment, the second operating state comprises charging the energy store of the portable device, during which the energy which is extracted from the energy store is obtained, and/or comprises charging with charging pulses, and/or comprises charging with an interval between two charging phases, and/or charging the energy store of the portable device, during which the energy content of the energy store is increased, as long as a power loss limit of the actuation apparatus has not yet been reached.

In a further embodiment, the actuation apparatus is configured in such a way that automatic switching over from the second into the first operating state takes place if a power loss limit of the actuation apparatus is reached.

In a further embodiment, the actuation apparatus is configured in such a way that automatic switching over from the first into the second operating state takes place if the energy store of the portable device has reached a predefined state of charge.

In a further embodiment, the actuation apparatus is configured in such a way that in the second operating state an amplitude of the excitation is reduced compared to an amplitude of the excitation of the first operating state.

In a further embodiment, the actuation apparatus is configured in such a way that in the second operating state a time interval up to the interrogation regarding the presence of the portable device in the vicinity of the charging device and/or regarding the state of the energy store of the portable device is increased compared to the first operating state.

Another embodiment provides a method for operating a charging device for a portable device, in particular of a motor vehicle, wherein the charging device comprises a resonant circuit, which can be controlled by means of an actuation apparatus, for inductively transmitting energy to the portable device, wherein the curve shape of the excitation of the resonant circuit is generated by the actuation apparatus as a function of an operating state.

In a further embodiment, the curve shapes of the excitation of the resonant circuit are different in a first and a second operating state in respect of the power loss occurring in the actuation apparatus.

In a further embodiment, a square-wave oscillation is used in the first operating state as the curve shape for the excitation of the resonant circuit.

In a further embodiment, an oscillation which deviates from the square-wave oscillation, in particular a sinusoidal oscillation or a trapezoidal oscillation, is used in the second operating state as the curve shape for the excitation of the resonant circuit.

In a further embodiment, automatic switching over from the second into the first operating state takes place if a power loss limit of the actuation apparatus is reached.

In a further embodiment, automatic switching over from the first into the second operating state takes place if the energy store of the portable device has reached a predefined state of charge.

In a further embodiment, an amplitude of the excitation is reduced in the second operating state compared to an amplitude of the excitation of the first operating state.

In a further embodiment, a time interval up to the interrogation regarding the presence of the portable device in the vicinity of the charging device and/or regarding the state of the energy store of the portable device is increased in the second operating state compared to the first operating state.

BRIEF DESCRIPTION OF THE DRAWINGS

Aspects of the invention are explained below with reference to FIG. 1, which shows a schematic illustration of an example charging device for inductively charging a portable device, according to one embodiment.

DETAILED DESCRIPTION

Embodiments of the present invention specify a charging device and a method for operating a charging device which is structurally and/or functionally improved.

Some embodiments provide a charging device for a portable device, in particular of a motor vehicle, which comprises a resonant circuit, which can be controlled by means of an actuation apparatus, for inductively transmitting energy to the portable device. In this context, the actuation apparatus is configured in such a way that the curve shape of the excitation of the resonant circuit is generated as a function of an operating state of the charging device.

Other embodiments provide a method for operating a charging device for a portable device, in particular of a motor vehicle, wherein the charging device comprises a resonant circuit, which can be controlled by means of an actuation apparatus, for inductively transmitting energy to the portable device. In this context, the curve shape of the excitation of the resonant circuit is generated by the actuation apparatus as a function of an operating state.

Some embodiments are based on the consideration that, in particular when the charging device is provided in a motor vehicle, the curve shape which is used to excite the resonant circuit can generate interference in other components of the motor vehicle. It may be possible to hear such interference, for example, in the motor vehicle's radio while the portable device is being charged. At present, a square-wave excitation of the resonant circuit is selected for the generation of the inductive alternating field since the actuation apparatus which is necessary for this purpose is cost-effective because the voltages or currents which have to be applied by the drivers are lower than those which are actually present at the coil of the resonant circuit which is provided on the charging device side. Furthermore, as a result of the square-wave excitation very much lower losses occur than in the case of an ideal sinusoidal actuation. However the square-wave excitation causes interference in other components such as, for example, the radio which has already been mentioned. In order to avoid or minimize the interference caused by the curve shape, it is proposed to generate the curve shape of the excitation of the resonant circuit as a function of an operating state of the charging device.

Generally, the operating state of the charging device can depend here on an operating state of the motor vehicle such as, for example, radio on/off, ignition on/off, or can be determined thereby.

The curve shapes of the excitations of a resonant circuit are expediently different in a first and a second operating state in respect of the power loss occurring in the actuation apparatus.

This makes it possible to use an optimized curve shape for each operating state. As a result, when the charging device is used in a motor vehicle, the interference described above can be kept as low as possible, since the effect of the interference correlates with the curve shape and therefore directly with the power loss.

In the first operating state a square-wave oscillation (or approximately square-wave oscillation) is provided as the curve shape for the excitation of the resonant circuit. As a result, as described, the actuation apparatus can apply lower voltages and currents than actually have to be available at a coil of the resonant circuit of the charging device. Furthermore, only small losses occur as a result of the square-wave actuation.

In particular, there is provision that the first operating state comprises charging the energy store of the portable device, during which the energy content of the energy store is increased. This is referred to as boost charging. Likewise, the first operating state comprises charging the energy store of the portable device while the ignition of the vehicle is switched off. In particular, in the last operating state it is important to be able to carry out the charging of the portable device with as little loss as possible. Since as a rule other components which can suffer interference as a result of the charging are not in operation when the ignition is switched off, the interference which is in principle possible as a result of the actuation of the apparatus is not relevant any more either.

In a further refinement, in the second operating state an oscillation which deviates from the square-wave oscillation is provided as the curve shape for the excitation of the resonant circuit. In particular, in this context, a sinusoidal oscillation is used. Likewise, any form which is possible between a sinusoidal oscillation and a square-wave oscillation, such as for example a trapezoidal oscillation, can be used.

The second operating state comprises, for example, charging the energy store of the portable device, during which the energy which is extracted from the energy store is obtained. This operating state is referred to as trickle charging. Since only small quantities of energy have to be transmitted to the portable device in this operating state, it is readily possible in this operating state to select a curve shape which is associated with relatively high losses during the operation of the actuation apparatus.

The second operating state also comprises charging with charging pulses and charging with an interval between two charging phases. Only a small amount of energy is also implemented in these two operating states, with the result that a curve shape which is subject to losses can be used.

The second operating state can also comprise charging the energy store of the portable device, during which the energy content of the energy store is increased if the charging device, in particular the actuation apparatus of the controllable resonant circuit, has not yet reached its power loss limit. As a result, the boost charging of the energy store of the portable device is permitted with a curve shape which, while having relatively high losses compared to the square-wave oscillation, at the same time has less interference with other components. A changeover to the square-wave oscillation is performed only if the power loss limit is reached or exceeded.

The actuation apparatus can be configured in such a way that automatic switching over from the second into the first operating state takes place if a power loss limit of the actuation apparatus is reached. This ensures that irrespective of the curve shape currently selected the actuation apparatus is not thermally overloaded and does not suffer damage owing to operation.

The actuation apparatus can also be configured in such a way that automatic switching over from the first into the second operating state takes place if the energy store of the portable device has reached a predefined state of charge. For this purpose, the portable device for the charging device can monitor the state of charge. In particular, it is monitored if the energy store is full in order then to select a curve shape which is an optimum with respect to a potential interference effect. As a result, the charging device is operated in such a way that it is operated with increased losses, but a lower interference potential.

The actuation apparatus can also be configured in such a way that in the second operating state an amplitude of the excitation is reduced compared to an amplitude of the excitation of the first operating state. This permits the charging device to be operated with relatively low power.

Likewise, the actuation apparatus can alternatively or additionally be configured in such a way that in the second operating state a time interval up to the interrogation regarding the presence of the portable device in the vicinity of the charging device and/or regarding the state of the energy store of the portable device is increased compared to the first operating state. As a result, the charging device is operated less frequently compared to a conventional charging device, which permits potential interference influences to be minimized.

With reference to FIG. 1, a charging device, which is, for example, a component of a motor vehicle, is characterized by the reference symbol 10. The charging device comprises an actuation apparatus 11 for controlling a resonant circuit 12. The actuation apparatus comprises, for example, two half-bridges, each with two controllable (semiconductor) switching elements which are connected to one another serially. The design of such an actuation apparatus is in principle known to a person skilled in the art. The resonant circuit 12 comprises, in a way which is also known to a person skilled in the art, a series circuit composed of an inductor and a capacitor as well as other components on an optional basis. Other components which are possibly present are not illustrated.

The portable device 20, for example a mobile phone, an audio/video playback device (MP3 player and the like), a portable computer etc., comprises an antenna 21, an evaluating and charging circuit 22 and an energy store 23. Further components, which are not essential for the invention, are not illustrated. Energy of the resonant circuit 12 can be picked up inductively by means of the antenna 21 and used to charge the energy store 23 via the evaluating and charging circuit 22. The technical design which is necessary here for the charging device 10 and the technical design necessary for the portable device 20 to be charged are known in principle from the prior art, with the result that more details are not necessary at this point.

Square-wave excitation of the resonant circuit 12 is preferably selected in order to generate the inductive alternating field by means of the actuation apparatus 11 for the purpose of boost charging the energy store 23 of the portable device. As a result, the actuation apparatus can, depending on its configuration, apply a lower voltage or a lower current than actually has to be present at the coil of the resonant circuit 12 of the charging device. Furthermore, as a result of the square-wave actuation of the resonant circuit 12, low losses occur at the actuation apparatus compared to an ideal sinusoidal shape.

Since a square-wave oscillation as a curve shape can result in interference at components which share the same supply circuit with the charging device and/or are arranged in spatial proximity, the curve shape of the excitation of the resonant circuit 12 is to be generated as a function of an operating state of the charging device 10. The described problems occur, in particular, when the charging device is used in a motor vehicle in which the interference can be input into other components, with the result that this interference can become perceptible, for example, in an audio system of the motor vehicle.

As explained, for boost charging the portable device square-wave or at least approximately square-wave actuation of the resonant circuit is used. Alternatively, actuation by means of pulse-width modulation and a subsequent low-pass filter is also conceivable for boost charging, in order to keep the power losses in the actuation apparatus as low as possible.

However, as long as the charging device, in particular the components of the actuation apparatus, are not yet operated at their power loss limit or while charging is performed briefly only at relatively long time intervals, for example in order to bring about communication between the charging device and the portable device or in order to detect whether metallic objects are moved in the vicinity of the charging device, alternative actuation with relatively high losses but a relatively low interference potential is selected. This alternative actuation comprises, in particular, the selection of another curve shape which differs from the square-wave oscillation. An ideal sinusoidal shape is preferably selected as a curve shape, since, as a result, the interference is minimal. The sinusoidal oscillation which is then generated by the actuation apparatus expediently has Gaussian resonance and decay ramps. Additionally or alternatively, the curve shape with relatively low amplitudes compared to the amplitudes of conventional charging can be selected.

By dispensing with square-wave actuation, interference can be avoided in the operating states in which boost charging is not necessary.

Likewise, it is possible to operate the actuation apparatus in such a way that the charging of the energy store to increase the energy content also takes place with a curve shape which is optimized with respect to the interference until the power loss limit of the components of the actuation apparatus is reached, and then to perform automatic switching over to square-wave actuation, in order to limit the losses occurring in the components of the actuation apparatus. This also permits the time periods in which interference originates from the charging device to be reduced.

In contrast, it is advantageous to operate the charging device with the square-wave oscillation if the portable device is to be charged while the ignition of the vehicle is switched off. In this operating state it is expedient to operate the components which are active in the charging device with minimum losses.

The disclosed method has the advantage that depending on the operating state of the charging device a suitable curve shape of the excitation of the resonant circuit of the charging device can be generated, in order to keep the interference originating from the charging device as low as possible.

What is claimed is:
1. A charger for a portable device deployed in a motor vehicle, the charger comprising:
  a resonant circuit configured to inductively transmit energy from the motor vehicle to the portable device; and
  an actuation apparatus configured to control the resonant circuit, wherein the actuation apparatus provides input to the resonant circuit with a curve shape selected from a set of predetermined shapes, a particular curve shape chosen from the set of predetermined shapes based at least in part on an operating state of the motor vehicle;

each particular curve shape in the set of predetermined shapes defined differently from the other shapes by more than amplitude and frequency.

2. The charging device of claim 1, wherein a curve shape of the excitation of the resonant circuit in a first operating state is different than a curve shape of the excitation of the resonant circuit in a second operating state based on a power loss occurring in the actuation apparatus.

3. The charging device of claim 1, wherein in a first operating state the selected curve shape is a square-wave oscillation for the excitation of the resonant circuit.

4. The charging device of claim 3, wherein the first operating state comprises at least one of:
 charging an energy store of the portable device, during which an energy content of the energy store is increased; and
 charging the energy store of the portable device while an ignition of the vehicle is switched off.

5. The charging device of claim 2, wherein in a second operating state the curve shape is a sinusoidal oscillation or a trapezoidal oscillation for the excitation of the resonant circuit.

6. The charging device of claim 5, wherein the second operating state comprises at least one of:
 charging an energy store of the portable device, during which the energy which is extracted from the energy store is obtained;
 charging with charging pulses;
 charging with an interval between two charging phases; and
 charging the energy store of the portable device, during which an energy content of the energy store is increased, as long as a power loss limit of the actuation apparatus has not yet been reached.

7. The charging device of claim 1, wherein the actuation apparatus switches over from a first operating state to a second operating state in response to reaching a power loss limit of the actuation apparatus.

8. The charging device of claim 1, wherein the actuation apparatus switches over from a first operating state to a second operating state in response to reaching a predefined state of change of an energy store of the portable device.

9. The charging device of claim 1, wherein the actuation apparatus is configured such that an amplitude of the excitation in a first operating state is reduced compared to an amplitude of the excitation of the second operating state.

10. The charging device of claim 1, wherein the actuation apparatus is configured such that in a first operating state a time interval up to an interrogation regarding at least one of the presence of the portable device near the charging device and a state of an energy store of the portable device is increased compared to a second operating state.

11. A method for charging a portable device using an energy store associated with a motor vehicle, the method comprising:
 inductively transmitting energy to the portable device from the motor vehicle with a charger, and
 selecting a particular curve shape of an excitation provided as input to a resonant circuit of the charger from a set of predetermined curve shapes, the particular curve shape selected from the set of predetermined curve shapes based at least in part on an operating state of the motor vehicle,
 each shape in the set of predetermined shapes defined differently from the other shapes by more than amplitude and frequency.

12. The method of claim 11, comprising controlling the resonant circuit such that the curve shapes of the excitation of the resonant circuit is different in a first operating state than in a second operating state based on a power loss occurring in the actuation apparatus.

13. The method of claim 11, comprising using a square-wave oscillation as the curve shape for the excitation of the resonant circuit in a first operating state.

14. The method of claim 13, comprising using a sinusoidal oscillation or a trapezoidal oscillation as the curve shape for the excitation of the resonant circuit in a second operating state.

15. The method of claim 11, further comprising switching over from a first operating state to a second operating state in response to reaching a power loss limit of the actuation apparatus.

16. The method of claim 11, further comprising switching over from a first operating state to a second operating state in response to reaching a predefined state of charge of an energy store of the portable device.

17. The method of claim 11, wherein an amplitude of the excitation is reduced in a second operating state compared to an amplitude of the excitation in a second operating state.

18. The method of claim 11, wherein in a first operating state a time interval up to the interrogation regarding at least one of the presence of the portable device near the charging device and a state of an energy store of the portable device is increased compared to a second operating state.

* * * * *